United States Patent [19]

McMahon

[11] 4,199,430

[45] Apr. 22, 1980

[54] SEAL CONSTRUCTION FOR ELECTROSTATIC FLUID TREATERS

[75] Inventor: Roy C. McMahon, Kansas City, Mo.

[73] Assignee: Electrostatic Equipment Company, Kansas City, Mo.

[21] Appl. No.: 914,847

[22] Filed: Jun. 12, 1978

[51] Int. Cl.² ............................................. B03C 9/00
[52] U.S. Cl. .................................................. 204/302
[58] Field of Search ............... 204/302, 305, 308, 279, 204/149

[56] References Cited

U.S. PATENT DOCUMENTS

| | | | |
|---|---|---|---|
| 3,968,022 | 7/1976 | Eng et al. .............................. | 204/279 |
| 4,024,047 | 5/1977 | Clark et al. ........................... | 204/302 |

OTHER PUBLICATIONS

Corrosion, July, 1960.
Materials Performance (NACE), 1974, p. 9.
Water Conditioning, July 1977.

Primary Examiner—Howard S. Williams
Attorney, Agent, or Firm—Fishburn, Gold & Litman

[57] ABSTRACT

An annular seal construction for sealing the ends of the flow passage between a pair of concentric, cylindrical electrodes of an electrostatic fluid treater includes a frusto-conical outer surface for engagement with a similar surface formed on the interior of the outer electrode, a cylindrical, inwardly directed seal face for sealed engagement with a dielectric annular electrode spacer mounted on the ends of the inner electrode, and an end surface for engagement by a cap received on the ends of the treater and urging the seal against the conical surface of the outer electrodes and into sealing engagement with the spacer.

6 Claims, 3 Drawing Figures

SEAL CONSTRUCTION FOR ELECTROSTATIC FLUID TREATERS

FIELD OF THE INVENTION

The present invention relates to electrostatic fluid treaters and more particularly to an improved seal construction therefor.

DESCRIPTION OF THE PRIOR ART

In electrostatic water treaters, effective sealing of the flow passage is important in order to prevent degraded performance due to short circuits or current paths, and the consequent reduced voltage, across the electrodes by way of the leaked fluid. In cylindrical treaters the most common type of seal between concentric electrodes is the O-ring. In general, there is a narrow circumferential gap between the parts to be sealed to permit assembly thereof. Over a period of time, this gap, being a relatively inactive region in the treater, is subject to a build-up of scale. If it is necessary to disassemble the treater, the scale build-up in this gap can hinder removal of the inner electrode or, in the case of treaters having the inner electrode enclosed in a dielectric sheath, result in damage to the sheath in breaking the inner electrode loose. Attempts at closing this gap by tighter fit of the parts have not been entirely successful, since assembly of the treater is made more difficult thereby. O-rings have not provided effective sealing when the treaters are employed in systems subject to abrupt increases in pressure, such as, for example, water hammer. After a leak has occurred, it is necessary to remove the treater from service for drying out and probable replacement of the sheath. In any case, disassembly of the treater for a periodic inspection generally requires replacement of the O-rings.

The seal construction of the present invention overcomes the above mentioned difficulties and is of such a configuration whereby assembly and disassembly of the treater is facilitated and wherein the seal is maintained even in the presence of abrupt pressure changes.

OBJECTS OF THE INVENTION

The principal objects of the present invention are: to provide an electrostatic fluid treater having concentric, cylindrical electrodes with an improved fluid passage seal construction; to provide such a seal construction with increased seal contact surface area which reduces the seal contact pressure necessary for effective sealing; to provide such a seal construction wherein the annular seal member has a conical outer surface engaging a complementary conical surface on the outer electrode whereby sealing engagement between the internal cylindrical seal face and the cylindrical electrode spacer is effected by application of a longitudinal force on an end surface of the seal member; to provide such a seal construction which eliminates from the treater a relatively inactive region which is subject to a buildup of scale during water treatment; to provide such a seal construction which facilitates assembly of the treater and disassembly thereof for maintenance; to provide such a seal construction wherein the seal member is less likely than prior arrangements to be damaged in disassembly of the treater; to provide such a seal construction which lessens the tight tolerances heretofore required to manufacture an effective seal member; to provide such a seal construction wherein the seal member has a triangular radial cross-section and wherein a circumferential apex of the seal member is exposed to the fluid passage whereby fluid under pressure therein aids in effecting the sealing engagement; to provide such a seal construction which can be feasibly retrofitted to certain existing treaters to upgrade the same; and to provide such a seal construction which is economical to manufacture, durable and effective in operation, and which is particularly well adapted for its intended purpose.

Other objects and advantages of this invention will become apparent from the following description taken in connection with the accompanying drawings wherein are set forth, by way of illustration and example, certain embodiments of the present invention.

The drawings constitute a part of the specification, include an exemplary embodiment of the present invention, and illustrate various objects and features of the improved seal construction.

Figure 1:
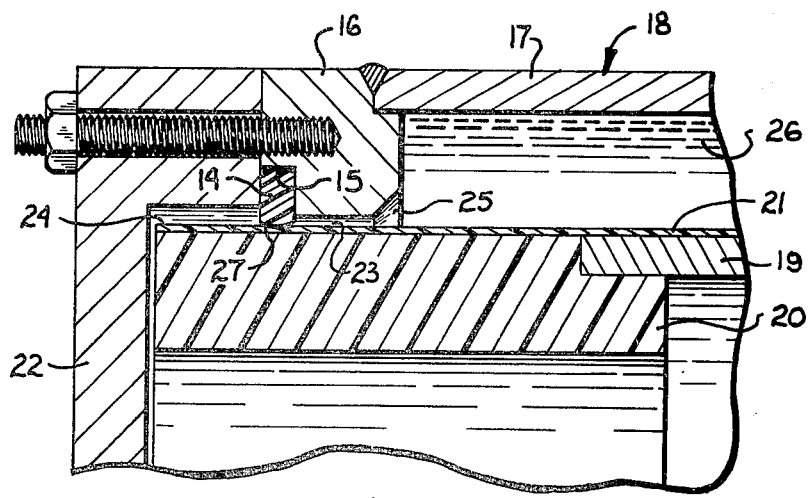
FIG. 1 is an enlarged, fragmentary longitudinal cross-sectional view of a prior art seal construction in an electrostatic fluid treater.

Referring to the drawings in more detail:

The reference numeral 1 generally designates a seal construction (see FIG. 2) for sealing a flow passage 2 between an inner electrode 3 and an outer electrode 4 of an electrostatic fluid treater 5. The seal construction 1 generally comprises an annular seal member or ring 6 having a triangular cross-section and interposed between an inwardly projecting flange 7 of the outer electrode 4 and a dielectric electrode spacer 8 received on one of the ends of the inner electrode 3 and forming an end portion 9 of the electrode 3. The outer electrode 4 and the flanges 7 comprise an outer electrode assembly or shell 10.

Figure 2:
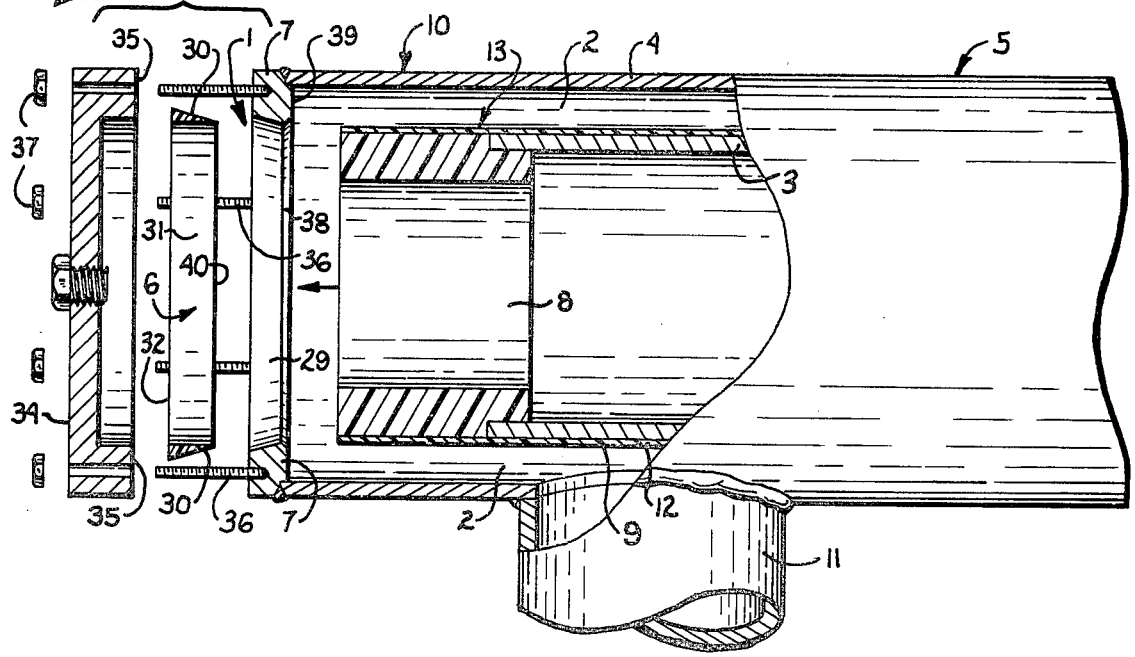
FIG. 2 is a fragmentary, exploded, elevational view at a reduced scale and illustrating an electrostatic fluid treater employing the improved seal construction.

The electrostatic fluid treater 5 is of the type which is, in addition to other uses, employed in water systems for treating the water in order to prevent or inhibit the deposition of scale or calcium carbonate on the walls of the water system. Such a treater is disclosed in U.S. Pat. No. 4,073,712, of which I am a co-inventor. FIG. 2 illustrates an electrostatic fluid treater 5 including an elongated, cylindrical inner electrode 3 mounted coaxially within a similar outer electrode 4 with the annular flow passage 2 between the electrodes 3 and 4. The treater 5 includes a conduit 11, which may be either an inlet or an outlet, communicating with the flow passage 2 and providing connection to a water system (not shown). The electrode spacer 8, in cooperation with the flange 7, positions the inner electrode 3 coaxially within the outer electrode 4 and positions the inner electrode 3 longitudinally with respect to the outer electrode 4 in order to maximize the electric field, from a high voltage across the electrodes, in the flow passage 2. It is desirable to prevent current flow between the electrodes 3 and 4 to maintain a strong electric field therebetween. Therefore, one of the electrodes is generally insulated, and in the illustrated treater 5, the inner electrode 3 includes a dielectric covering or sheath 12 which is continuous along the outer surfaces of the electrode 3 and the spacers 8 at the ends thereof. The inner electrode 3 with the spacers 8 on the ends and the dielectric sheath 12 constitute an inner electrode assembly 13.

FIG. 1 illustrates a prior art arrangement for sealing the flow passage of an electrostatic fluid treater. The seal construction illustrated in FIG. 1 includes an O-ring 14 which is positioned in a recess or groove 15 formed on an end flange 16 of the outer electrode 17 thereof. The treater 18 of FIG. 1 includes an inner electrode 19, a dielectric electrode spacer 20 positioned on the ends of the electrode 19, and a dielectric sheath 21 covering the inner electrode and spacer 20. An end cap 22 is fastened on the end of the treater 18 to close the end thereof and to compress the O-ring 14 to provide greater sealing contact between the O-ring 14 and the spacer 20 by way of the dielectric sheath 21.

Referring to FIG. 1, the seal construction of the treater 18 includes a circumferential gap 23 between the flange 16 and the dielectric sheath 21. In operation of the treater 18, the gap 23 is a relatively inactive region of the treater in that fluid which enters the gap 23 is not exchanged regularly and, further, since the electric field in the treater is minimal in the gap 23. Therefore, the gap 23 is subject to a build-up of scale which causes difficulty in removing the inner electrode 19 for periodic maintenance. In electrostatic fluid treaters, it is generally advisable to disassemble the treater periodically in order to clean from the dielectric sheath 21 scale which normally deposits thereon as a result of the electro-chemical conditions adjacent the inner electrode. While the gap 23 could be eliminated by closer tolerances between the flange 16 and the spacer 20, such a close fit is difficult to realize in manufacturing the parts economically. Further, assembly of the closer fitting electrode and flange is more difficult and may result in damage to the end 24 of the sheath 21 during attempted insertion of the electrode 19 through the flange 16. In order to facilitate assembly of the treater 18, the innermost corner of the flange 16 is provided with a bevel 25.

There are problems associated with the O-ring 14 itself in sealing the flow passage 26 of the treater 18. The O-ring 14 must be stiff enough to resist deformation under fluid pressure while at the same time resilient enough to permit manipulation thereof during assembly of the treater and in order to fill in around the spacer 20 with the sheath thereon for proper sealing. The O-ring 14 must contact the sheath surface with sufficient force for sealing under pressure. However, a strong contact force over the limited contact surface area causes deformation of the sheath 21, as shown in FIG. 1 at 27. Increasing the contact area by making the O-ring 14 thicker results in a more expensive O-ring and more difficult manipulation thereof during installation. During routine maintenance, it is generally necessary to replace the O-ring 14 which is usually damaged upon removal during disassembly of the treater 18.

Figure 3:
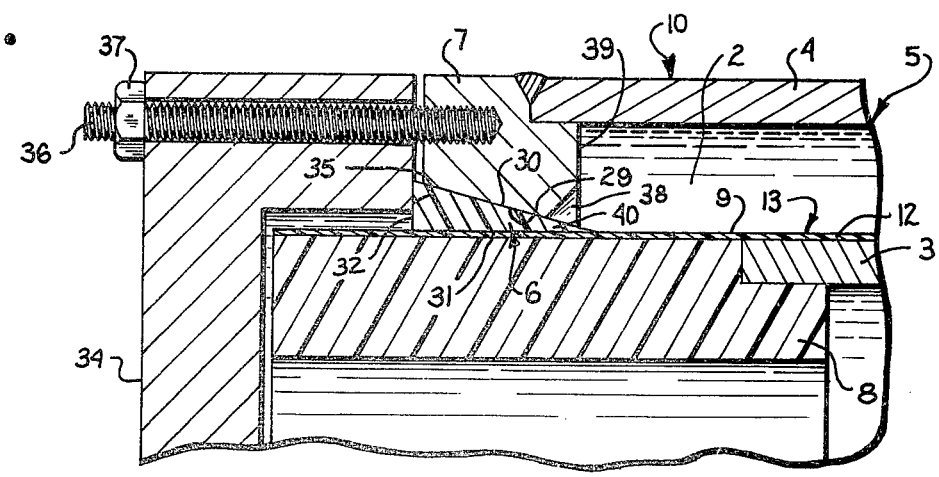
FIG. 3 is a view similar to FIG. 1 showing details of the improved seal construction.

The seal construction 1 overcomes many of the difficulties associated with the seal construction shown at FIG. 1. In the seal construction 1, the flange 7 is provided with an outwardly diverging frusto-conical seal receiving surface 29. The seal member or arrangement 6 is, preferably, an integral seal member and is provided with a corresponding sloping or frusto-conical outer surface 30. The seal member 6 includes an internal, cylindrical seal face 31 and an end surface 32. The seal member 6 has a wedge or triangular shaped cross-section, as is illustrated in FIGS. 2 and 3. Prior to installation on the treater 5, the seal member 6 has an inner diameter slightly greater than the outer diameter of the spacer 8 with the sheath 12 thereon. Preferably, the seal member 6 is formed from a hard plastic with limited resilience, such as FEP Teflon, ethylene propylene, or the like.

In operative position, as shown in FIG. 3, a force is applied to the end surface 32 which compresses the seal member 6 against the seal receiving surface 29 until the seal face 31 engages the outer surface of the dielectric sheath 12. In the embodiment illustrated, the force acting on the end surface 32 is supplied by an end cap 34 having an abutment surface 35, in cooperation with selectively tightenable fasteners, such as the studs 36 and nuts 37. As the nuts 37 are tightened, the abutment surface 35 moves into contact with the seal member end surface 32 and compresses the seal member into sealing engagement with the sheath 12. The flange 7 may be provided with a bevel 38, on the blind side 39 thereof, in order to facilitate insertion of the inner electrode assembly 13 through the flange 7 during assembly of the treater 5. The flange 7 and the seal member 6 may be so constructed whereby circumferential apex 40 of the seal member 6 is exposed in the fluid passage 2 by the bevel 38. Such an arrangement allows fluid under pressure in the passage 2 to aid in the sealing engagement of the seal member 6 with the sheath 12. In contrast to the seal arrangement shown in FIG. 1, abrupt pressure increases within the flow passage 2 tends to increase rather than break the seal. Further, the arrangement allows greater clearance between the inner electrode assembly and the flange 7 whereby assembly of the treater 5 is facilitated.

In assembling the treater 5, the inner electrode assembly 13 is inserted through the flange 7 at one end of the outer electrode 4, and passed through to the other end thereof whereby the seal receiving surfaces 29 are in surrounding relation to the end portions 9 of the assembly 13. The assembly 13 is adjusted longitudinally whereby an equal portion thereof protrudes from each end of the outer electrode. A seal member 6 is slipped over each end of the inner electrode assembly and pressed into place with the outer surface 30 in contact with the seal receiving surface 29 of each flange 7. The caps 34 are then positioned on the studs 36 and the nuts 37 are threaded thereon and tightened in an alternating manner to specified torque whereby the force exerted by the cap 34 is evenly distributed. As the nuts 37 are tightened, the seal member 6 is compressed longitudinally and, by reaction of the outer surface 30 against the seal receiving surface 29, inwardly against the sheath 12 until the seal face 31 is in effective sealing engagement with the surface of the sheath 12.

By comparing FIG. 3 with FIG. 1, it can be seen that the contact area of the seal face 31 is significantly greater than that of the O-ring 14 whereby less contact pressure is required for effective seal. Further, the gap 23 and the problems associated therewith are eliminated. The area bounded by the bevel 38 and the apex 40 is subject to some build-up of scale; however, to a lesser degree than the arrangement of FIG. 1. To disassemble the treater 5, the cap 34 is removed by loosening and removing the nuts 37. If the seal member 6 does not pop out upon removal of the cap 34, the seal 6 may be loosened by carefully tapping on the flange 7 or on the exposed end of the spacer 8 in order to break up any scale that might be deposited around the bevel 38. After cleaning of the sheath 12 and inspection of the various parts as is necessary, the treater 5 may be reassembled and, in most cases, the seal member 6 may be reused.

While certain forms of the present invention have been described and illustrated, it is not to be limited thereto except insofar as such limitations are included in the following claims.

What I claim and desire to secure by Letters Patent is:

1. In combination:
an electrostatic fluid treater having an elongated, cylindrical inner electrode assembly positioned coaxially within an elongated, cylindrical shell with an annular flow passage therebetween, said inner electrode assembly including an inner electrode and said shell including an outer electrode; and a seal construction for sealing engagement between respective opposite ends of said inner electrode assembly and said shell, said seal construction comprising:
   (a) a generally inwardly facing, circumferential seal receiving surface formed at each end of said shell;
   (b) an annular seal arrangement positioned in sealing engagement with said seal receiving surface, said seal arrangement including a sloping surface engaging said seal receiving surface, an inwardly facing seal face, and a force receiving end surface;
   (c) means applying a force to said end surface thereby compressing said seal arrangement against said seal receiving surface and said seal face into sealing engagement with said inner electrode assembly;
   (d) said seal receiving surface being a frusto-conical surface diverging toward a respective end of said shell;
   (e) said sloping surface being a generally outwardly facing, frusto-conical surface engaging said seal receiving surface;
   (f) said seal arrangement including a circumferential apex portion adjacent a convergence of said seal face and the frusto-conical surface thereof; and
   (g) the frusto-conical side of said apex portion being exposed within said flow passage whereby fluid under pressure within said passage enhances sealing engagement between the seal face side of said apex portion and said inner electrode assembly.

2. The combination as set forth in claim 1 wherein:
   (a) said shell includes an inwardly projecting circumferential flange located at each end thereof;
   (b) said seal receiving surface is formed on said flange;
   (c) said flange includes a circumferential bevel facing inwardly and away from the end of said shell at which said flange is located; and
   (d) said bevel exposes the frusto-conical side of the apex of the seal arrangement associated with said shell end.

3. The combination as set forth in claim 1 wherein:
   (a) said inner electrode assembly includes:
      (1) said inner electrode,
      (2) a dielectric annular electrode spacer sealingly received on each end of said inner electrode,
      (3) a single dielectric sheath enclosing said inner electrode and said spacer on each end; and
   (b) said seal face engages said sheath.

4. The combination as set forth in claim 1 including:
   (a) an end cap received on each end of said shell, said cap having an abutment surface in engagement with the end surface of a respective seal arrangement; and
   (b) tightenable fastening means on said cap and on each end of said shell, said fastening means being tightened to apply a selected force to said end surface of a respective seal arrangement.

5. In a seal construction for sealing engagement between a wall and a cylindrical member passing therethrough and including a sealing ring having a wedge shaped half cross-section, said cylindrical member being means on an inner electrode assembly of an electrostatic fluid treater and said wall being an inwardly directed circumferential end flange of the outer electrode assembly of said treater, said inner electrode assembly being coaxially positioned within said outer electrode assembly to define an annular flow passage therebetween and intermediate a flange at each end of said outer electrode assembly, a liquid being under pressure during passage through said treater and being subject to abrupt momentary increases in pressure, the improvement comprising:
   (a) each flange being formed within said flow passage in such a manner that a circumferential apex portion of said sealing ring is exposed to said liquid in said treater, whereby said sealing ring is urged into greater sealing engagement with said means on said inner electrode assembly by an increase in the pressure of said liquid without decreasing the sealing engagement thereof with said flange.

6. A seal construction as set forth in claim 5 wherein each flange is beveled on the flow passage side thereof in surrounding relation to said means on said inner electrode assembly to thereby expose said apex portion of said sealing ring within said flow passage.

* * * * *